United States Patent [19]
Kok

[11] Patent Number: 5,461,795
[45] Date of Patent: Oct. 31, 1995

[54] MEASURING INSTRUMENT AND METHOD OF MAKING SAME

[75] Inventor: Tat C. Kok, Kowloon, Hong Kong

[73] Assignee: Ever-Success Development Co., Ltd., Kowloon, Hong Kong

[21] Appl. No.: 98,038

[22] Filed: Jul. 28, 1993

[30]     Foreign Application Priority Data

Mar. 25, 1993 [GB] United Kingdom ............... 9306227

[51] Int. Cl.⁶ ........................... B43L 7/00; G01B 3/02
[52] U.S. Cl. ............................... 33/483; 33/493
[58] Field of Search ................. 33/483, 492, 493, 33/494, 403, 562, 679.1; 264/328.7

[56]     References Cited

U.S. PATENT DOCUMENTS

| | | | |
|---|---|---|---|
| 806,546 | 9/1904 | Lawless | 33/493 |
| 2,089,209 | 8/1937 | Keuffel et al. | 33/494 |
| 2,210,422 | 8/1940 | Mercer | 33/494 |
| 2,247,157 | 6/1941 | Little | 33/492 |
| 2,892,437 | 6/1959 | Natoli | 33/492 |
| 2,948,064 | 8/1960 | Wentsel | 33/494 |
| 3,934,352 | 1/1976 | Quenot | 33/493 |

FOREIGN PATENT DOCUMENTS

| | | | |
|---|---|---|---|
| 1078780 | 3/1960 | Germany | 33/493 |
| 1436521 | 3/1973 | United Kingdom . | |
| 1503039 | 12/1975 | United Kingdom . | |

*Primary Examiner*—Christopher W. Fulton
*Attorney, Agent, or Firm*—Leydig, Voit & Mayer

[57]     ABSTRACT

A measuring instrument, e.g. a ruler, has an upper measuring surface provided with graduation marks and numerals and a lower surface. The instrument comprises a first plastics molding formed with apertures therein and one or more second moldings molded to the lower surface of the first molding and having portions which extend at least into, and preferably through, the apertures in the molding to define the graduation marks and numerals. The two moldings and are of contrasting visual impact, e.g. different colors.

6 Claims, 2 Drawing Sheets

MEASURING INSTRUMENT AND METHOD OF MAKING SAME

This invention relates to measuring instruments, particularly rulers, protractors, set squares and the like, made of plastics material, and to a method of making such an instrument.

In the past, graduation marks and numerals have been applied to measuring instruments by printing or the like. These tend to wear off.

SUMMARY OF THE INVENTION

According to a first aspect of the invention, there is provided a measuring instrument having an upper measuring surface provided with graduation marks and/or numerals and a lower surface comprising a first plastics molding formed with apertures therein and one or more second plastics moldings molded to the lower surface of said first molding and having portions extending at least into the apertures in the first molding to define said graduation marks and/or numerals, the first and second moldings being of contrasting visual impact.

Preferably, said portions of said second molding(s) extend through the apertures in said first molding and lie proud of the measuring surface of said first molding.

In this case, advantageously, those parts of said portions which lie proud of the measuring surface of the first molding are larger than their respective apertures in said first molding and overlie the measuring surface of said first molding.

Conveniently, there is a single second molding defining all graduation marks and/or numerals. In this case, the first molding may have a recess in its lower surface and the second molding may be disposed in said recess. Additionally or alternatively, the second molding may extend over substantially the entire area of the lower surface of the first molding.

According to a second aspect of the invention, there is provided a method of making a measuring instrument according to the first aspect of the invention, comprising the steps of:

(a) forming in a first mold a first plastics molding with apertures therein, and then (b) transferring the first plastics molding to a second mold and molding one or more second plastics moldings to the lower surface of said first molding with portions of said second molding(s) extending at least into the apertures in the first molding to define graduation marks and/or numerals.

The invention will now be more particularly described, by way of example, with reference to the accompanying drawings.

DESCRIPTION OF THE PREFERRED EMBODIMENT

Figure 1:
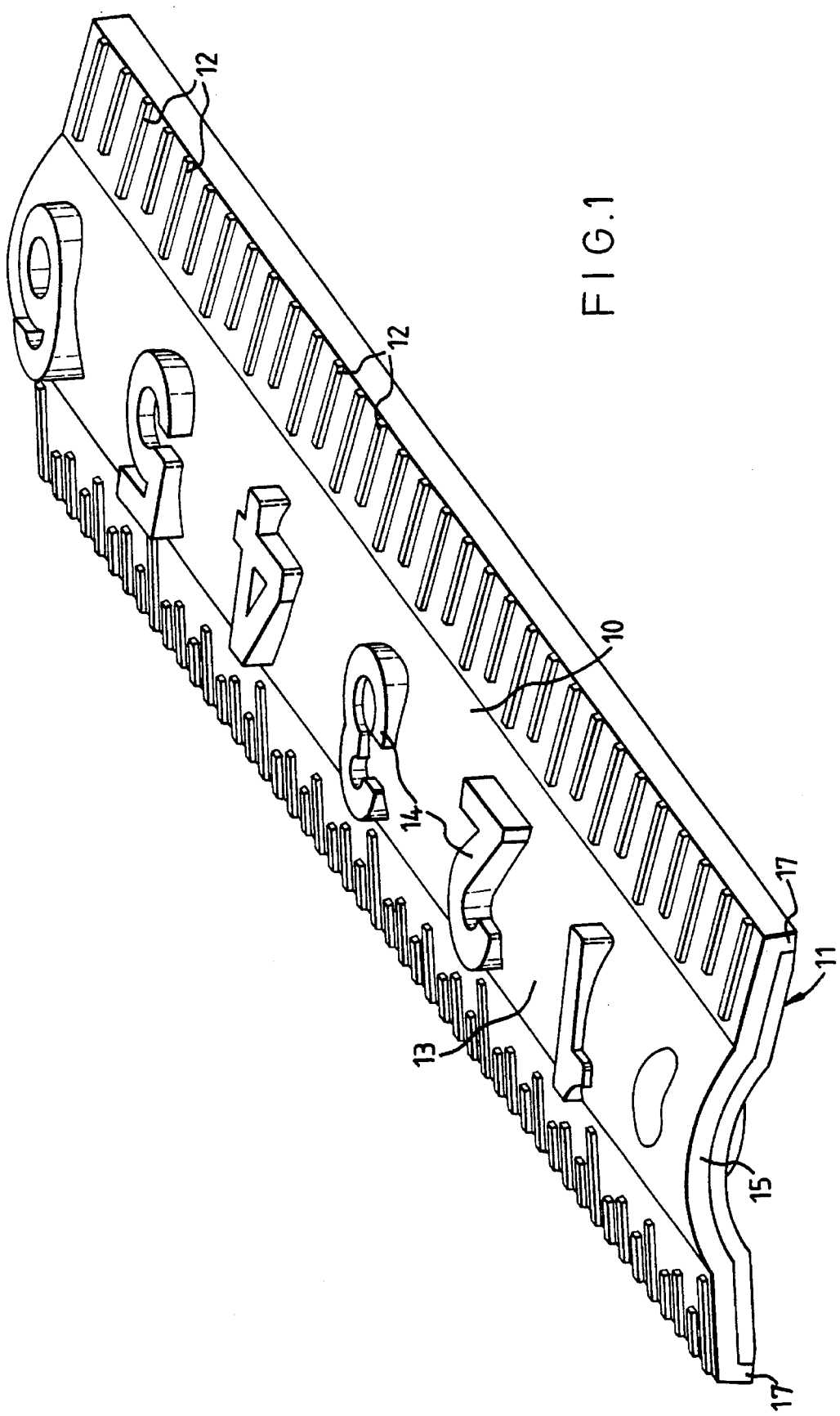
FIG. 1 is a perspective view of one embodiment of a measuring instrument according to the first aspect of the invention.

The drawings show a measuring instrument in the form of a plastic ruler.

The ruler comprises first and second moldings 10 and 11, respectively, of contrasting visual impact e.g. of different colors. The ruler has a plurality of graduation marks 12 along opposite edges of an upper measuring surface 13 and a plurality of numerals 14 on a raised, central, elongate hump 15 of the measuring surface 13.

Figure 2:
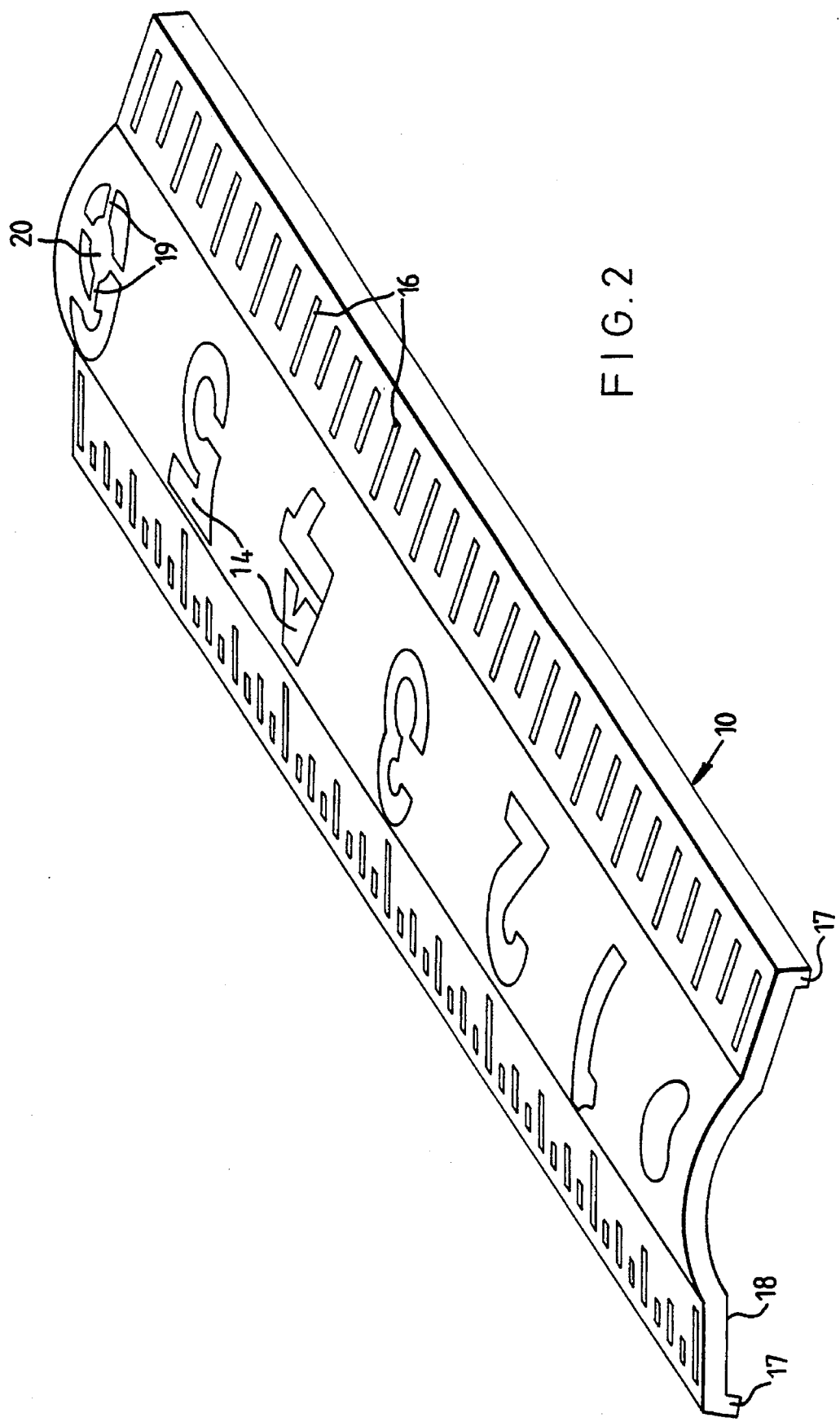
FIG. 2 is a perspective view of the measuring instrument of FIG. 1 after a first stage of manufacture.

The first molding 10 generally overlies the second molding 11 and the graduation marks 12 and numerals 14 are formed by portions of the second molding which extend through apertures 16, shown in FIG. 2, in the first molding and which lie proud of the measuring surface 13 of the first molding 10.

The ruler is made by molding the first molding 10 in a first mold and then transferring the molding 10 to a second mold and molding the second molding 11 to the first molding 10.

The first molding 10 has a depending flange 17 along each of its opposed longitudinal edges to define an elongate recess 18 therebetween. The second molding 11 is provided in the recess 18 and extends over substantially the entire area of the lower surface of the first molding 10 and through the apertures 16.

Those parts of the portions of the second molding 11 which lie proud of the measuring surface 13 of the first molding 10 are slightly larger than the apertures 16 and overlie the measuring surface 13. This allows the graduation marks 12 to extend to the edge of the ruler. It also conceals webs 19 which support central parts 20 of the numerals '4' and '6' and also helps to key the second molding 11 to the first molding 10.

Other measuring instruments, e.g. protractors and set squares, can be made in similar manner.

In the example given, there is a single second molding 11. However, the molding 11 could consist of a plurality of separate parts. Also the second molding 11 could have portions which extend into, but not through, the apertures 16.

What I claim is:

1. A measuring instrument having an upper measuring surface provided with graduation marks and numerals and a lower surface comprising a first plastics molding formed with apertures therein and one or more second plastics moldings molded to a lower surface of said first molding and having portions extending through the apertures in the first molding and lying proud of the measuring surface of the first molding, the portions being larger than the apertures of said first molding and overlying the measuring surface of said first molding.

2. A method of making a measuring instrument, the measuring instrument having an upper measuring surface provided with graduation marks and numerals and a lower surface comprising a first plastics molding formed with apertures therein and one or more second plastic moldings molded to a lower surface of said first molding and having portions extending at least into the apertures in the first molding to define the graduation marks and numerals, the first and second moldings being of contrasting visual impact, the method comprising the steps of:

(a) forming in a first mold the first plastics molding with apertures therein, and (b) transferring the first plastic molding to a second mold and molding one or more of the second plastic moldings to the lower surface of said first molding with portions of said one or more second moldings extending at least into the apertures in the first molding to define graduation marks and numerals.

3. The method of claim 2 wherein said first plastics mold is molded to said one or more second plastics moldings such that the portions of said one or more second plastics moldings extend through the apertures in the first mold and are raised with respect to the first plastic molding.

4. A measuring instrument comprising a first plastics molding layer having an upper surface with apertures representing measurement graduation marks and numerals, said first plastics molding layer also having a bottom surface, and second plastics molding layer molded directly onto the bottom surface of the first plastics molding layer, substantially covering the bottom surface and having parts extending through the apertures to form protruding measurement graduation marks and numerals which are slightly larger than their respective apertures in order to secure the first and second plastics molding layers.

5. A measuring instrument as claimed in claim 4 wherein the first and second molding layers have a contrasting visual impact.

6. A measuring instrument as claimed in claim 5 wherein the first molding layer and the second molding layer are different colors.

* * * * *